June 13, 1972   D. J. BRIDGEFORD   3,669,791
GAS RELEASE FROM CELLULOSE CASING BY MULTIPLE PERFORATIONS
Original Filed Dec. 13, 1967

DOUGLAS J BRIDGEFORD
*INVENTOR.*

BY his attorney

United States Patent Office 3,669,791
Patented June 13, 1972

3,669,791
GAS RELEASE FROM CELLULOSE CASING BY MULTIPLE PERFORATIONS
Douglas J. Bridgeford, Champaign, Ill., assignor to Tee-Pak, Inc., Chicago, Ill.
Original application Dec. 13, 1967, Ser. No. 690,161. Divided and this application Dec. 11, 1970, Ser. No. 97,215
Int. Cl. B29c 19/00
U.S. Cl. 156—244
7 Claims

ABSTRACT OF THE DISCLOSURE

A method of venting fluids from artifiicial tubular casings made by the viscose process comprises perforating multiple small holes in a discrete area of the cellulose xanthate casing during regeneration thereof. The holes are subsequently patched by application of a solid film patch, such as regenertaed cellulose film, onto the gel casing with a water-activated adhesive, such as alpha-cyanomethyl acrylate monomer.

CROSS-REFERENCE TO RELATED APPLICATION

This application is a division of applicant's co-pending application Ser. No. 690,161 filed Dec. 13, 1967, now U.S. Pat. 3,562,368.

BACKGROUND OF THE INVENTION

This invention relates to a new and improved method of venting fluids from artificial tubular casings made by the viscose process. More particularly, it relates to a method of puncturing and sealing wet cellulose or gell cellulose sausage casings during the regeneration of the cellulose.

Artificial tubular casings, particularly sausage casings formed of regenerated cellulose, are prepared as hollow, thin-walled tubes of very great length. In the manufacture of continuous seamless regenerated cellulose sausage casings by the viscose process, such as is described in Dietrich et al. U.S. Pat. No. 1,908,892, a tubular casing is formed by continuously extruding viscose through an annular nozzle into an aquarium containing a mixture of sulfuric acid and sodium sulfate or ammonium sulfate or equivalent coagulating and regenerating agents. The viscose, as it passes through the aquarium, is coagulated and partially regenerated.

During the coagulating and regenerating step, gases are evolved and are entrapped within the tubular casing. In addition, water arising from syneresis of the primary xanthate gel and water entering the casing during salt formation within the casing must be released therefrom. The water enters the casing because its activity in the concentrated salt solution initially within the casing is less than its activity outside the casing. In order to prevent the casing from bursitng, the water and gases must be released by puncturing the casing. In order to effect a release of these fluids, the casing is cut periodically by cutting longitudinally through the surface of the gas-inflated casing, producing a slit type opening. Generally, larger slits are required for the removal of the water as compared with the gases.

The extruded casing continues through the regeneration, desulfuring, wash and glycerination baths. The casing is then dried in an inflated state by entrapping a bubble of air between two sets of squeeze rolls, maintained at the entrance and exit of a hot air drier. In order to effect continuous inflation for drying, the casing must be free of any punctures.

Accordingly, it has been the practice to cut out that section of casing containing the puncture prior to its entrance into the dryer. The cut ends of the casing were then connected together in such a manner as to allow for the continuous passage of air through the interior of the tubing. The connection was formed by inserting into a cut end of the casing a short, flexible rubber tube or coupling. The other cut end of casing was slipped over the first end containing the tubular coupling and the two ends held together on the coupling as by circumferentially winding and knotting a piece of string over the telescoped cut sections. The coupling insert permitted free passage of air within the casing as it passed through the dryer, thus providing a bubble for inflating the tube during the drying operation, said bubble being continuously maintained by the aforedescribed squeeze rolls.

The main disadvantage is in the time and discontinuity involved in effecting this closure and in its subsequent removal. The closure is removed prior to reeling since when the casing is reeled as a flattened tubing after drying, the presence of a tubular insert causes much wrinkling of the casing on the reel.

Another disadvantage in using a tubular insert to effect closure of a punctured casing is in the amount of casing which is wasted. A further disadvantage in the case of frankfurter casing which is shirred to form a compressed stick of convenient size for stuffing operations lies in the fact that the section of casing carrying the coupling cannot pass over the shirring mandrel of the shirring apparatus and the casing cannot be shirred continuously.

Bonding or laminating dry regenerated ecllulose to itself or other materials by use of an adhesive when the cellulose is dry is known. However, attempts to seal a puncture in wet regenerated cellulose seamless tubing by either coating the puncture with a film-forming material or using adhesive patches have generally not been uscccessful. Adhesive materials, such an animal and vegetable glues, viscose, rubber adhesives, and other polymeric compositions, do not bond sufficiently and rapid enough to wet regenerated cellulose to form a seal resistant to the inflating air pressure and the shear forces which occur when the wet cellulose tubing is dried in the inflated state.

The failure of such adhesive patches to perform satisfactorily can be accounted for by the extremely high moisture content of the regenerated cellulose casing immediately prior to drying. Typically, the casings after passing through the several water washes and aqueous glycerine and after being wiped as by doctor blades to remove surface water, contain from about 60 to about 80 percent by weight of water. The pressure of such large amounts of water, in the case of the water-soluble animal or vegetable glues or viscose, causes dilution of the glue and resultant weak bonds. In the instance of the rubber adsives, the water content of the wet casing inhibits wetting of the regenerated cellulose surface by the water-insoluble rubber adhesive.

There have been previous attempts to patch wet cellulose with a patch of flexible material secured to the cellulose surface by means of a water-soluble polyvinyl alcohol, see Shiner et al., U.S. Pat. No. 3,247,037. The failure of such adhesive patches to prove successful commercially is largely due to difficulty in application and the slow rate of development of adhesive strength.

STATEMENT OF OBJECTS AND FEATURES

Accordingly, it is an object of this invention to provide a new and improved method of venting fluids from artificial tubular casings made by the viscose process during the regeneration of cellulose from cellulose xanthate.

Another object of this invention is to provide a method of venting fluids from artificial tubular casings such as cellulose sausage casings and sealing the vent holes in the casing.

Yet another object of this invention is to seal vent holes in wet regenerated cellulose tubular casings with a seal capable of retaining the inflating air in the casing and resistant to the shearing forces encountered during the drying of the wet casing in the inflated state.

Still another object of this invention is the sealing of vent holes in wet regenerated cellulose tubing with sealing materials, producing an effective seal with little or no interruption to the continuous manufacture of such tubing and with little or no wastage of casing.

A feature of this invention is the provision of multiple small vent holes (generally in a discrete area of the casing) to permit the venting of fluids from a gel regenerated cellulose sausage casing.

Another feature of this invention is the provision of a process wherein multiple vent holes are provided in a gel regenerated cellulose sausage casing and the holes subsequently covered by a patch applied with a water-activated adhesive.

SUMMARY OF THE INVENTION

This invention is based upon my discovery of a new and improved method of venting gases and liquids from artificial tubular casings such as cellulosic casings during the regeneration of cellulose from cellulose xanthate. It has been found that the cellulose xanthate casing or other tubular body can conveniently be perforated by any of numerous devices to form small spaced holes, usually within a discrete area of the casing. This perforation is done as the casing is treated to regenerate the cellulose. The gases and liquids produced during regeneration and trapped on the inside of the casing pass out through these holes. The total hole area is sufficient to permit ample fluid loss. At a predryer or in a wet processing state, the holes can be patched with a film patch such as regenerated cellulose secured with a water-activated adhesive such as alpha-cyanomethyl acrylate monomer (which polymerizes and cures on contact with moisture).

DESCRIPTION OF THE PREFERRED EMBODIMENT

In the preferred embodiments of this invention, viscose is extruded through an annular opening into a suitable coagulation and regeneration bath. The hollow tube which is formed is subsequently treated with a regeneration bath to thoroughly regenerate cellulose. The regenerated cellulose tube is then subjected to a series of wash baths and finally treated with an aqueous solution of glycerin for plasticizing the casing. The casing is then dried in an inflated state and reeled in preparation for shirring or other processing.

At the point of extrusion, the casing is inflated by gaseous by-products which are formed within the interior of the extruded tube and also by water arising from syneresis of the primary cellulose xanthate gel and water entering the casing by osmosis. As noted above, it has been customary to cut the casing periodically by making longitudinal slashes with a sharp knife or razor blade to produce a slit-type opening. This cutting or puncturing of the casing is generally done after coagulation but prior to the regeneration bath. The cut or puncture allows the gases and liquid within the casing to vent. The casing was previously cut to remove the portion containing the puncture and the cut end connected by means of a rubber coupling which permitted the casing to be inflated for drying.

Figure 1:
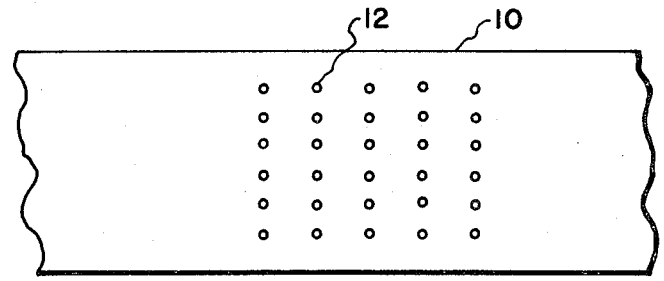
FIG. 1 is a plan view of a portion of a portion of a casing perforated in accordance with this invention.

In this embodiment of the invention, the cutting of the casing with a relatively large slit for purposes of venting is replaced with a plurality of perforations or small holes. This embodiment of the invention is more readily understood by reference to FIG. 1 wherein there is shown a portion 10 of the casing which has been perforated by holes 12 in accordance with this invention. The perforations may be formed in the casing by any suitable means and are preferably made while the casing is inflated so that the holes are made in only one wall of the casing. The holes 12 may be formed by a mechanical device such as a cylinder mounted for rotary movement and having projecting prongs which engage and perforate the wall of the cellulose xanthate tube. A suitable apparatus for perforating casing in this manner is shown in Rumsey, Jr., U.S. Pat. No. 2,608,488. High pressure water jets, high pressure air jets, spark discharges, glass knives, punches formed of glass or other erosion resistant material, and the like can also be employed to give snag-free holes.

In carrying out this embodiment of the invention, the holes which are formed are located in a relatively small discrete area of the casing. The holes which are formed are sufficient in number and in size to provide a total area for the openings which is sufficient to permit the rapid venting of gases and liquids from within the casing. The total area must be sufficient to vent the fluids fast enough, depending upon the line speed of the process machine, so that no substantial distortion of the wet regenerated cellulose casing takes place.

In carrying out this embodiment of the invention, the holes which are formed are preferably closely spaced and are quite small. The holes are preferably about 0.025 in. in diameter, although holes ranging from about 0.01 to 0.05 in. in diameter can be used. The total number of holes formed and the spacing of the holes, as well as the spacing of separate puncture areas, depends upon the speed of operation of the process machine and the amount of fluid buildup which must be relieved. Generally, it has been found quite satisfactory to employ approximately 100 holes grouped in a square area approximately 2 square centimeters in area. The holes are generally circular in form and must be snag-free and spaced so that the casing does not tend to break or tear.

As previously noted, it is preferred that the holes be perforated in the cellulose xanthate, or partially regenerated cellulose, casing while it is in a semi-tubular or tubular condition so that the holes will only perforate one side of the casing and not extend through the other side. This is conveniently done at a stage during the regeneration process wherein the casing is partially extended because of gases formed within the casing and water present as a result of osmotic forces. If the natural inflation of the casing is not sufficient, the casing may be partially or completely blown up prior to perforating the holes therein.

After the holes have been perforated in the casing, the fluids vented, and the regeneration, desulfurizing, washing, and glycerination steps completed, the holes must be patched to permit inflation of the casing in the dryer.

Figure 2:
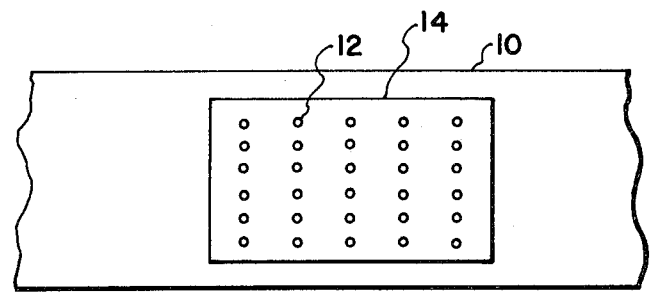
FIG. 2 is a portion of a casing such as that shown in FIG. 1 covered with a patch in accordance with one embodiment of this invention.

The multiple perforations in the casing are preferably sealed by means of a patch 14 applied over the holes by a suitable water-activated cement, as illustrated in FIG. 2. Any suitable patch may be applied over the holes utilizing an adhesive which will adhere readily to wet or gel cellulose, preferably an adhesive such as alpha-cyanomethyl acrylate monomer which is catalyzed by contact with moisture is rapidly polymerized to form a strong adhesive bond on wet cellulose. Any adhesive may be used which is activated by contact with water or moisture and rendered adhesive by such contact without the necessity of drying.

In the following examples, there are illustrated several preferred embodiments of the invention which illustrate the perforation of partially regenerated cellulose to release fluids therefrom and the sealing of the vent holes by the application of an adhesively bonded patch to the casing covering the vent holes.

Example 1

In the manufacture of regenerated cellulose sausage casings, coagulated and partially regenerated cellulose xanthate tubing was perforated to release gases formed in regeneration and water entering the tubing by osmotic forces. The cellulose xanthate tubing was perforated using a tool having a plurality of closely spaced pointed rods or pins of very small diameter. The casing was perforated with 100 closely spaced holes about 0.025 in. in diameter. After the casing was regenerated and washed, a patch was applied over the perforations using a water-catalyzed adhesive. The patch which was applied to the perforated area of the casing was a single thickness of regenerated cellulose film and was applied to the casing using an alpha-cyanoalkyl acrylate monomer. The alpha-cyanoalkyl acrylate monomer is a water-catalyzed adhesive which polymerizes readily upon contact with water and effects a firm bond between the patch and the casing. In this process, the adhesive used was Eastman 910, a proprietary composition manufactured by Tennessee Eastman Company, comprising alpha-cyanomethyl acrylate monomer containing a small amount of a plasticizer. When the adhesive is applied to the patch and then applied to the wet casing, the adhesive is rapidly polymerized and effects a tight bond between the patch and the casing. As a result, the multiple perforations are effectively sealed and the casing will hold air under a substantial pressure in the dryer.

Example 2

Regenerated cellulose casing in the form of an extruded tube of partially coagulated and regenerated cellulose xanthate was perforated with a plurality of small holes as described in the general procedure set forth above. The multiple perforations were of a size and number permitting rapid venting of gases and liquids from within the casing. After the casing was completely regenerated and washed, a patch was applied utilizing an adhesive which is specially adherent to moist regenerated cellulose.

The procedure followed was essentially that described in Example 1 in which the adhesive was applied to a patch comprising a single layer of regenerated cellulose film and the patch applied over the multiple perforated area on the casing. In this example, the adhesive used was a polyisocyanate adhesive which sets up readily even in the presence of moisture. In this example, the adhesive used was Nacconate 100 (2,4-tolylene diisocyanate manufactured by National Aniline Division of Allied Chemical and Dye Corporation). The adhesive was applied to the patch and the patch applied over the multiple perforated area with the result that a firm seal was effected sufficient to permit the casing to be inflated under a substantial air pressure during drying.

Example 3

In this example, regenerated cellulose casing was perforated with a plurality of small closely spaced holes to vent gases and liquids from the interior of the casing as described in the previous examples. A patch of regenerated cellulose film was cemented over the perforated holes, after completion of the regeneration and washing steps, using a polymeric polyisocyanate as the adhesive.

The polymeric polyisocyanate adhesive used in patching the perforated casing is a reaction product of 2,4-tolylene disocyanate and triethylene glycol in a 4:3 molar ratio, prepared as follows:

Two-thirds equivalent (58.0 g.) of tolylene diisocyanate (Nacconate 100) was weighed into a 250 ml. beaker. Next, 4.5 g. of methylethyl ketone was added to the beaker as a mutual solvent for the reaction. The beaker was placed under a Heller mixer and stirred vigorously while one-half equivalent (37.5 g.) of triethylene glycol was added drop-wise. During the reaction period, an additional 7.8 g. of methylethyl ketone were added to replace the solvent which had boiled off. The reaction mixture was allowed to cool occasionally to 70° C. before additional triethylene glycol was added. At the end of the reaction period, a polymeric polyisocyanate reaction product was obtained which is a clear lemon-yellow syrup.

In patching a multiple perforated casing in accordance with this example, the polymeric polyisocyanate adhesive was applied to a regenerated cellulose film and the film applied as a patch over the perforated area. The adhesive set up readily and provides a film bond sealing the holes in the casing and permitting the casing to be inflated under a substantial air pressure during drying.

In this example and the preceding examples, the patch which was applied to the multiple perforated area on the cellulose casing was described as a regenerated cellulose film. In practice, any suitable sheet material which is impermeable and flexible, such as paper, cotton, cloth, etc., may be used as the patch. The adhesive may be applied either to the patching material or to the surface of the perforated casing. If necessary, the adhesive may be applied to the perforated casing at the area surrounding the holes and the patch with additional adhesive applied thereto to seal the holes in preparation for inflation of the casing in the dryer.

In the foregoing examples, the procedure of perforating a gel casing and applying a patch over the perforations or applying a fluid patching material to fill the perforations has been described with reference to a clear, tubular, regenerated cellulose casing. The procedure can be used, however, on any gel or wet cellulose film and is especially useful in the manufacture both of clear, regenerated cellulose casings and regenerated cellulose casings reinforced with a paper web (known in the art as fibrous casings). It should also be noted that while the process of applying patches to a perforated gel cellulose or of filling the holes in a perforated gel cellulose with an adhesive patching fluid has been described with special reference to regenerated cellulose made by the viscose process, it is obvious that the technique of patching or of applying a patching fluid to holes in gel cellulose or wet cellulose is equally applicable to wet regenerated cellulose made by other processes such as the denitration of nitrocellulose or deactylation of cellulose acetate, as well as modified cellulosic films, such as cellulose ethers. It should also be noted that, while the process of perforating a film and subsequently patching or filling the perforations has been described with special emphasis upon regenerated cellulose, it is obvious that the process may, in principle, be applied to the patching of other plastic films. In the manufacture of any tubular plastic film wherein the extrusion of the material is continuous and there is a buildup of fluids within the film, the fluids may be released by perforating the film with a plurality of small, closely spaced holes and subsequently applying a patch over the perforated area or applying a fluid patching material to fill the holes in the perforated area.

This process is especially adaptable to automation. The steps of perforation and patching can be performed by automatic equipment. Also, the patching film may be colored, which makes possible automatic sensing of the patch, photo-electrically, during further processing, such as reeling or shirring.

I claim:

1. In the method of producing tubular casings by continuous extrusion of a polymeric material through an annular die into an aqueous medium, wherein fluid accumulate within the extruded casing, the improvement which comprises perforating said casing with a plurality of small holes to vent the accumulated fluids, and applying a patching film to the outside of said casing to cover said holes by means of a water-activated adhesive applied to the film or to the casing in the area being patched.

2. A method in accordance with claim 1 in which the patch is a cellulose film.

3. A method in accordance with claim 1 in which the adhesive is an alpha-cyanoalkyl acrylate monomer of a polyisocyanate.

4. A method in accordance with claim 1 in which the casings are produced by extrusion of viscose through an annular die into a coagulating and regenerating medium and subsequently washed, plasticized, and dried, and the perforations are made after extrusion to release by-product gases and osmotic water within the casing.

5. A method in accordance with claim 4 in which the perforation of said casing is done at select intervals and said plurality of holes are closely spaced and are of a number and size adequate to effect a rapid venting of fluids from within said casing.

6. A method in accordance with claim 5 which the patch is a cellulose film.

7. A method in accordance with claim 5 in which the adhesive is an alpha-cyanoalkyl acrylate monomer or a polyisocyanate.

References Cited

UNITED STATES PATENTS 3,551,270  12/1970  Sharkey _____ 156—252 X

CARL D. QUARFORTH, Primary Examiner

S. J. LECHERT, JR., Assistant Examiner

U.S. Cl. X.R.

156—252, 331